(12) United States Patent
Nakajima

(10) Patent No.: US 7,785,200 B2
(45) Date of Patent: Aug. 31, 2010

(54) GAME DEVICE AND STORAGE MEDIUM HAVING GAME PROGRAM STORED THEREIN

(75) Inventor: Souichi Nakajima, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 502 days.

(21) Appl. No.: 11/255,887

(22) Filed: Oct. 24, 2005

(65) Prior Publication Data

US 2006/0116202 A1 Jun. 1, 2006

(30) Foreign Application Priority Data

Nov. 30, 2004 (JP) ............................. 2004-346265

(51) Int. Cl.
*A63F 13/00* (2006.01)
*A63F 13/06* (2006.01)
*A63F 13/10* (2006.01)

(52) U.S. Cl. .................... 463/33; 463/30; 463/31; 463/32; 273/317.1; 273/461; 345/419; 345/473; 345/636; 345/653; 434/44; 434/257; 375/240.16

(58) Field of Classification Search ............... 463/1–5, 463/7–9, 30–34, 36–39, 40–43, 49–57; 273/108.1, 273/127 R, 148 R, 148 B, 309, 317.1, 340, 273/348, 361–367, 461; 348/14.15, 39, 42, 348/47–52, 115, 117, 121, 135–137, 141, 348/211.14, 576, 588–589, 719, 721, E13.004, 348/E13.064–E13.067; 717/168–178; 345/1.1–1.3, 345/2.1–2.3, 3.1–3.4, 24, 419, 467–469, 345/473, 539, 543–544, 625, 636, 638, 653–656, 345/664–666, 682–683, 686, 949–950, FOR. 139, 345/FOR. 153; 434/37–38, 43–44, 69, 118, 434/240, 256–257; 375/240.15–240.16, 375/240.25; *A63F 13/00, 13/06, 13/10*
See application file for complete search history.

(56) References Cited

U.S. PATENT DOCUMENTS

| 4,695,953 | A | * | 9/1987 | Blair et al. ..................... 463/3 |
| 4,892,311 | A | * | 1/1990 | Zaitsu .................... 273/145 D |
| 4,909,513 | A | * | 3/1990 | Kiyono ....................... 463/22 |

(Continued)

FOREIGN PATENT DOCUMENTS

JP 11-216269 8/1999

(Continued)

*Primary Examiner*—Peter DungBa Vo
*Assistant Examiner*—Arthur O. Hall
(74) *Attorney, Agent, or Firm*—Nixon & Vanderhye P.C.

(57) ABSTRACT

An object is provided with a plurality of vectors each having a direction and an end position assigned to the object in a fixed manner. The game device moves the object in a three-dimensional game space, and determines whether a part of the object has contacted a predetermined surface or not. When it is determined that a part of the object has contacted the predetermined surface, a vector among the plurality of vectors, the vector having an end located at a position closest to a predetermined direction is specified. Also, when it is determined that a part of the object has contacted the predetermined surface, the game device lands the object on the predetermined surface in a position such that the specified vector faces toward the predetermined surface, and is perpendicular to the predetermined surface.

11 Claims, 11 Drawing Sheets

U.S. PATENT DOCUMENTS

| | | | | |
|---|---|---|---|---|
| 5,031,913 | A * | 7/1991 | Hirosumi et al. | 273/145 C |
| 5,195,746 | A * | 3/1993 | Boyd et al. | 463/37 |
| 5,238,249 | A * | 8/1993 | Elias et al. | 463/22 |
| 5,463,722 | A * | 10/1995 | Venolia | 345/662 |
| 5,865,435 | A * | 2/1999 | Ikeda et al. | 273/145 R |
| 5,986,675 | A * | 11/1999 | Anderson et al. | 345/473 |
| 5,999,185 | A * | 12/1999 | Kato et al. | 345/420 |
| 6,067,096 | A * | 5/2000 | Nagle | 345/473 |
| 6,322,448 | B1 * | 11/2001 | Kaku et al. | 463/32 |
| 6,394,901 | B1 * | 5/2002 | Marta | 463/20 |
| 6,471,586 | B1 * | 10/2002 | Aiki et al. | 463/6 |
| 6,626,759 | B1 * | 9/2003 | Matsuoka | 463/31 |
| 6,764,396 | B2 * | 7/2004 | Seelig et al. | 463/17 |
| 7,246,103 | B2 * | 7/2007 | Herbrich et al. | 706/62 |
| 7,601,055 | B2 * | 10/2009 | Eika | 463/6 |
| 2005/0277470 | A1 * | 12/2005 | Watanachote | 463/37 |

FOREIGN PATENT DOCUMENTS

JP    2001-43397    2/2001

* cited by examiner

| VECTOR | LENGTH | DIRECTION |
|---|---|---|
| FIRST VECTOR | 20 | (xa, ya, za) |
| SECOND VECTOR | 20 | (xb, yb, zb) |
| THIRD VECTOR | 1 | (xc, yc, zc) |
| FOURTH VECTOR | 2 | (xd, yd, zd) |

GAME DEVICE AND STORAGE MEDIUM HAVING GAME PROGRAM STORED THEREIN

BACKGROUND

1. Field of the Technology

The technology presented herein relates to a game device and a storage medium having a game program stored therein, and more particularly, for example, to a game device and a storage medium having a game program stored therein for indicating a behavior of an object landing on a ground in a virtual game space.

2. Description of the Background Art

In a conventional video game, there are cases where a state of an object falling in a virtual three-dimensional space, and landing on a ground is displayed. For example, a state of an object such as a dice which is thrown, falls on the ground, and bounces and rolls on the ground, and then come to rest on the ground is displayed. As a concrete method for describing such state, a first and second method as shown below may be considered.

A first method is a method based on an actual physical behavior. That is, when a part of a falling object contacts a ground, a rebound force is calculated based on a contact position and a speed of the object. In addition, a subsequent behavior of each vertex of the object is calculated based on the rebound force. Based on such behavior, a behavior of the object bouncing and rolling after contacting the ground is displayed. When a part of the object contacts the ground for the next time, a rebound force is calculated, and a behavior of each vertex of the object is calculated in the same manner as described above. Thereafter, by repeating the above calculation until the object stops, a behavior of the object until the object comes to rest on the ground is calculated. According to the first method, a behavior of an object can be displayed realistically.

A second method is a method for determining a face closest to the ground as a landing face. According to this method, when an object contacts the ground, a face closest to the ground (e.g., a face having a smallest angle with the ground) is calculated and the face is determined as the landing face of the object. FIG. 14 is a diagram illustrating a state of a falling object contacting the ground. FIG. 14 is a sideways view of the ground. In FIG. 14, since face ABCD of an object 91 is determined to be a face closest to the ground (i.e., an angle to the ground is smallest), the face ABCD is determined as the landing face. Therefore, as shown in FIG. 15, the object is stopped in a position with the face ABCD contacting the ground. The second method allows to calculate a final landing face of an object with a small processing amount, and to display a behavior of the object by a relatively easy process.

Methods of calculating, when an impact is applied to an object in a virtual space, a subsequent behavior of the object is described in patent document 1 (Japanese Laid-open Patent Publication No. 2001-43397) and patent document 2 (Japanese Laid-open Patent Publication No. 11-216269) for example. In the method described in patent document 1, when an impact is applied to an object having a predetermined rotation axis, a position of the object where the impact is applied to, and an impact vector are calculated. Then a rotating operation of the object is performed based on the impact vector and a distance between the position and the rotation axis or a rotation center of the object. Thereby, a realistic display of a rotating operation of an object is provided. In addition, a method described in patent document 2 is a method for performing a weapon repelling action when a weapon of a player character and a weapon of an enemy character collide. According to this method, when the weapon of the player character and the weapon of the enemy character collide, a direction of movement of each weapon after the collision is calculated based on factors such as a direction of movement of each weapon before the collision.

According to the first method, even though a realistic display of a landing state of an object can be provided, there is a problem that an enormous amount of calculation is required. Considering that there are game devices with low processing performance, it is difficult to employ the first method for a game process.

On the other hand, according to the second method, a face that is located closest to the ground at a time when the object contacts the ground is determined to be a landing face of the object when the object is stopped. In examples shown in FIGS. 14 and 15 a landing face of the object 91 is determined to be face ABCD which is closest to the ground. As mentioned above, according to the second method, the object lands on any one of the faces, and landing easiness of each face is equal. When displaying a state of an object landing on a ground, depending on the contents of the game, it may be preferable that a landing direction of an object and landing easiness in the direction are freely assigned. For example, when displaying a state of an object landing in a natural manner, taking the examples of FIGS. 14 and 15, it is natural and preferable that a face BCGF becomes the landing face. However, according to the second method, a landing face of an object is uniquely determined based on an angle to a ground at a time when the object contacts the ground. Thus, it is not allowed to freely assign a landing easiness of each face. In addition, depending on the contents of the game, there may be cases where it is preferable for the object 91 to land with the vertex pointing downwards (i.e., in a direction with the vertex sticking in the ground). However, according to the second method, since possible landing directions of the object are determined by a shape of the object 91, it is not possible to land the object with the vertex pointing downwards. Furthermore, according to the second method, it is not possible to determine a landing direction of an object which has a curved surface. Consequently, according to the second method, since possible landing directions of an object and landing easiness in each direction are uniquely determined by the shape of the object, there may be cases when an intention of a game creator cannot be reflected.

Note that patent document 1 provides a calculation method for an object having a predetermined rotation axis. For an object without a rotation axis, such as an object falling on a ground, the method described in patent document 1 is not applicable. Patent document 2 provides a method of calculating, when two objects collides, a direction in which each object moves after the collision. A precondition for this method is that each of the collided objects moves after the collision, thus a case where the two objects stop in a collided position is not considered. Furthermore, in a case when the objects are stopped in a collided position, a position of each object (in which direction the object is stopped in) is not considered. Therefore, even if one object is considered as a ground, and the other object is considered as a falling object, the method provided in the patent document 2 is not applicable to a process of displaying a landing behavior of a falling object.

SUMMARY

Thus, a feature of an example embodiment presented herein is to provide a game device and a game program for displaying a landing state of an object by a simple method, and freely assigning landing directions of the object and a landing easiness in each direction.

To attain the above, the example embodiment has adopted the following features. Note that the reference numerals within parentheses, which are provided only for showing correspondences to drawings to facilitate a better understanding of the example embodiment, do not restrict the scope of the example embodiment in any manner.

A first aspect of the present invention is directed to a storage medium having a game program stored therein, the game program causing a game device (10) to execute a process of displaying on a display device (first LCD 11) a state of objects (40, 50 and 60) landing on a predetermined surface (ground) in a virtual three-dimensional game space. The game program causes a computer (CPU core 21, etc.) of the game device to function as movement control means (CPU core 21, etc., for executing step S6) (hereinafter only step numbers will be shown), determination means (S7 or S32), specifying means (S11), and landing means (S12). The object is provided with a plurality of vectors (41 to 46, 51 to 54, and 61 to 66) each having a direction and an end position assigned to the object in a fixed manner. The movement control means moves the object in a three-dimensional game space. The determination means determines whether a part of the object has contacted a predetermined surface or not. When the determination means determines that a part of the object has contacted the predetermined surface, the specifying means specifies a vector among a plurality of vectors whose end is closest to a predetermined direction (direction of gravity). When the determination means determines that a part of the object has contacted the predetermined surface, the landing means lands the object on the predetermined surface in a position such that the vector specified by the specifying means faces toward the predetermined surface and is perpendicular to the predetermined surface.

According to a second aspect, the object may be configured with a plurality of faces and each face may have a point. The determination means determines that a part of the object has contacted the predetermined surface when the point on any face among the faces of the object has contacted the predetermined surface.

According to a third aspect, the determination means may determine that a part of the object has contacted the predetermined surface when an end of any vector among the vectors has contacted the predetermined surface.

According to a fourth aspect, the object may be configured with a plurality of faces. Each face of the object is provided with a vector which is perpendicular to the face (refer to FIG. 3).

According to a fifth aspect, a length from a center of the object to an end of each vector may be lengthened in accordance with an area of a face which the vector is associated with.

According to a sixth aspect, the landing means may include rotation means (S21) and translation means (S23). The rotation means rotates the object so that the vector specified by the specifying means faces toward the predetermined surface and is perpendicular to the predetermined surface. The translation means translates the object after being rotated by the rotation means, so that the object contacts the predetermined surface. The object contacts the predetermined surface facing against the predetermined direction.

According to a seventh aspect, the game program may further cause the computer to function as speed calculation means (S8). The speed calculation means calculates, when the determination means determines that a part of the object has contacted a predetermined surface, a movement speed of the object at a time of when the object has contacted the predetermined surface. The landing means lands the object on the predetermined surface only when a calculation result provided by the speed calculation means is below a predetermined speed.

The example embodiment presented herein may be provided in a form of a game device having functions of the above means.

According to the first aspect, it is possible to determine a landing direction of the object and a landing easiness in the direction by a use of directions and end positions of vectors provided to the object. That is, since a landing direction of the object may be assigned independent of a shape of the object, a landing face can be freely determined without being restricted by the shape of the object. In addition, since an end position of each vector is used to specify a landing direction, a landing easiness can be freely determined. Furthermore, since the landing direction is determined only by evaluating an end position of each vector, a landing direction of the object can be determined by a simple calculation.

According to the second aspect, the object is displayed without sinking unnaturally into the predetermined surface, thus a landing movement of an object is displayed in a more natural manner. In addition, whether a part of the object has contacted the predetermined surface or not can be easily determined.

According to the third aspect, whether a part of the object has contacted the predetermined surface or not can be easily determined.

According to the fourth aspect, the plurality of faces configuring the object may each be provided with a vector which is perpendicular to the face.

According to the fifth aspect, a length from the center of the object to an end of a vector indicating a landing easiness is determined in accordance with an area of a face, thus it is possible to provide a realistic display of a movement of an object landing on a predetermined surface.

According to the sixth aspect, a state of a polyhedral object landing on any one of a plurality of faces can be displayed by a simple method.

According to the seventh aspect, when a movement speed of the object is larger than a predetermined speed, a landing movement of the object is not performed (typically in such case, an operation to bounce the object on the predetermined surface is performed). As the landing movement is performed only when a speed of the object is lowered to a certain amount, it is possible to provide a realistic display of a behavior of an object landing on a predetermined surface.

These and other features, aspects and advantages of the example embodiment presented herein will become more apparent from the following detailed description of the example embodiment when taken in conjunction with the accompanying drawings.

DESCRIPTION OF THE PREFERRED EMBODIMENTS

A configuration and an operation of a game device according to an embodiment will be described below.

First Embodiment

Figure 1:
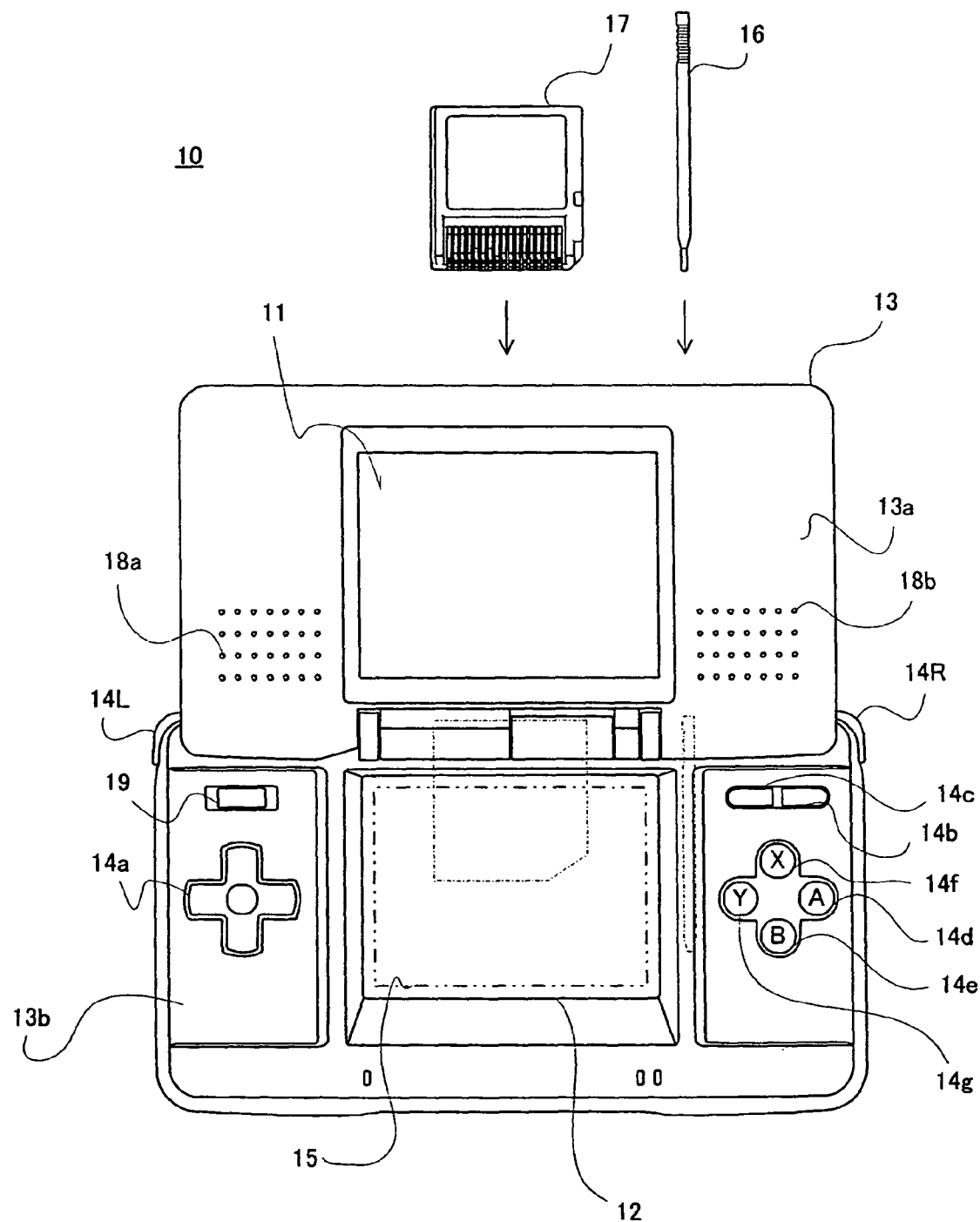
FIG. 1 is a plan view illustrating a game device according to a first embodiment.

FIG. 1 is an external view of a game device according to a first embodiment of the present invention. In FIG. 1, a game device 10 includes a first LCD (Liquid Crystal Display) 11 and a second LCD 12. A housing 13 comprises an upper housing 13a and a lower housing 13b, and the first LCD 11 is stored in the upper housing 13a, and the second LCD 12 is stored in the lower housing 13b. Resolutions of the first LCD 11 and the second LCD 12 are both 256 dots×192 dots. Note that though a LCD is used as a display device in the first embodiment, any other display devices such as a display device using an EL (Electro Luminescence) may be used. Also, resolution of the display device may be at any level.

The upper housing 13a is provided with sound holes 18a and 18b for releasing a sound from a pair of loudspeakers (30 of FIG. 2) to an exterior. A description of the pair of loudspeakers will be provided later.

The lower housing 13b is provided with input devices as follows; a cross switch 14a, a start switch 14b, a select switch 14c, a "A" button 14d, a "B" button 14e, a "X" button 14f, a "Y" button 14g, a "L" button 14L, and a "R" button 14R. In addition, a touch panel 15 (shown by a chain double-dashed line in FIG. 1) is provided on a screen of the second LCD 12 as another input device. The lower housing 13b further includes a power switch 19, and insertion openings (shown by alternate long and short dashed lines) for storing a memory card 17 and a stick 16.

The touch panel 15 may be of any type such as a resistive film type, an optical type (infrared type), or a capacitive coupling type. The touch panel 15 has a function of outputting, when its surface is touched with the stick 16, coordinates data which corresponds to a touch position. Though the following description is provided on an assumption that the player uses the stick 16 to operate the touch panel 15, of course the touch panel 15 may also be operated by a pen (Stylus pen) or a finger instead of the stick 16. In the first embodiment, a touch panel 15 having a resolution at 256 dots×192 dots (detection accuracy) as same as the second LCD 12 is used. However, resolutions of the touch panel 15 and the second LCD 12 may not necessarily be consistent with each other.

The memory card 17 is a storage medium having a game program stored therein, and placed in the insertion slot provided at the lower housing 13b in a removable manner.

Figure 2:
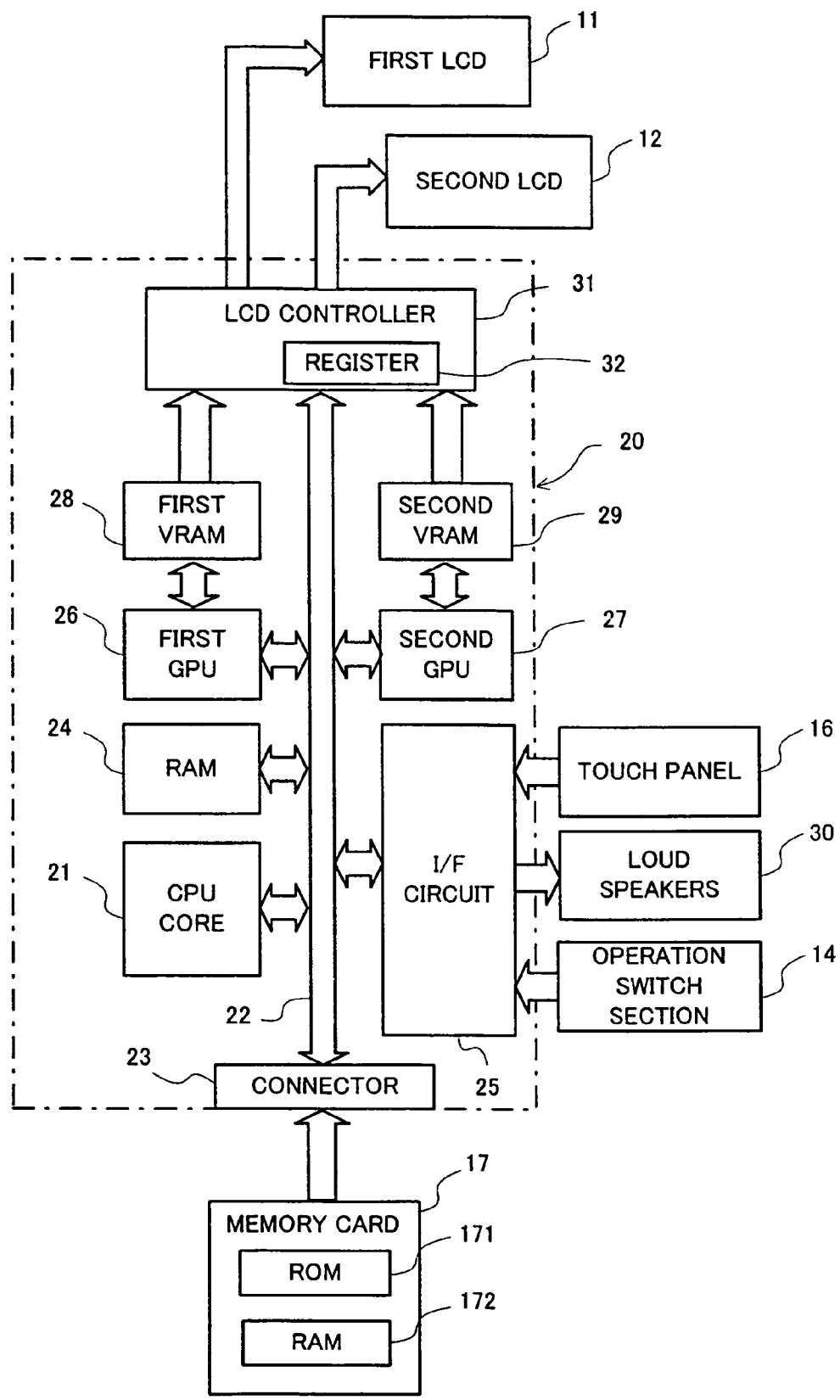
FIG. 2 is a diagram illustrating an internal configuration of a game device.

Next, an internal configuration of the game device 10 will be described by referring to FIG. 2. In FIG. 2, a CPU core 21 is mounted on an electronic circuit board 20 which is to be housed in the housing 13. Via a bus 22, the CPU core 21 is connected to a connector 23, an input/output interface circuit (shown as I/F circuit in the diagram) 25, a first GPU (Graphics Processing Unit) 26, a second GPU 27, a RAM 24, and a LCD controller 31. The memory card 17 is connected to the connector 23 in a removable manner. The memory card 17 includes a ROM 171 for storing a game program and a RAM 172 for storing backup data in a rewritable manner. The game program stored in the ROM 171 of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. To the I/F circuit 25 are connected, a touch panel 15, loudspeakers 30 and an operation switch section 14, which is comprised of a cross switch 14a, a "A" button 14d, and others, as shown in FIG. 1. The loudspeakers 30 are arranged inside the sound holes 18a and 18b, respectively.

A first VRAM (Video RAM) 28 is connected to the first GPU 26, and a second VRAM 29 is connected to the second GPU 27. In accordance with an instruction from the CPU core 21, the first GPU 26 generates a first game image based on data used for image generation which is stored in the RAM 24, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a resistor 32. The resistor 32 stores a value of either 0 or 1 in accordance with an instruction from the CPU core 21. When the value of the resistor 32 is 0, the LCD controller 31 outputs to the first LCD 11 the first game image which has been written into the first VRAM 28, and outputs to the second LCD 12 the second game image which has been written into the second VRAM 29. When the value of the resistor 32 is 1, the first game image which has been written into the first VRAM 28 is outputted to the LCD 12, and the second game image which has been written into the second VRAM 29 is outputted to the first LCD 11.

Note that the above configuration of the game device 10 is illustrative only. The example embodiment presented herein may be applied to any computer system including at least one display device. In addition, the game program of the example embodiment which is provided to a computer system through an external storage medium such as the memory card 17, may also be provided through a wired or a wireless communication line, or may be stored in advance in a nonvolatile storage device provided in the computer system.

A game to be performed in the game device 10 will be described below. In the game, a ground and an object appear in a virtual three-dimensional game space. The game may be of any genre. In the game, a state of the object which is thrown in a virtual three-dimensional game space and lands on the ground is displayed on a first LCD 11. Though the first embodiment exemplifies a case where the object is a rectangular parallelepiped, the object may be of any shape.

Figure 3:
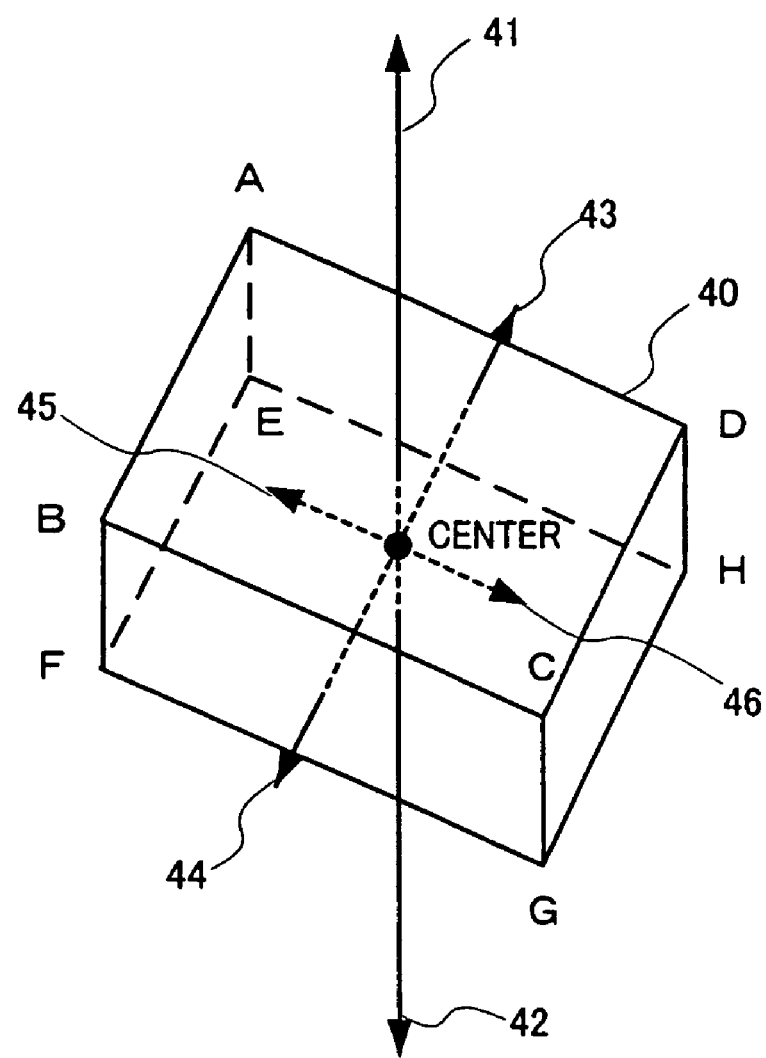
FIG. 3 is a diagram illustrating an object according to a first embodiment.

FIG. 3 is a diagram illustrating an object according to the first embodiment. As illustrated in FIG. 3, a plurality of vectors 41 to 46 are provided to an object 40. In FIG. 3, in order to make the diagram comprehensible, sections of each of the vectors 41 to 46 inside the object 40 are shown by dotted lines. A starting point of each of the vectors 41 to 46 is provided at the center of the object 40. Each of the vectors 41 to 46 is provided so as to associate with each of the faces configuring the object 40. To be more specific, a vector is associated with a face located in a direction to which the vector extends toward from the center of the object 40. For example, since the vector 41 is a vector extending toward face ABCD from the center of the object 40, the vector 41 is associated with face ABCD. In the same manner, the vector 42 is associated with face EFGH, the vector 43 is associated with face AEHD, the vector 44 is associated with face BFGC, the vector 45 is associated with face ABFE, and the vector 46 is associated with face CGHD. Also in the first embodiment, the vector is provided in a direction to be perpendicular to an associated face. In the first embodiment, each of the faces configuring the object is provided with one vector which is perpendicular to the face. Note that the vector is virtually provided to the object, thus the vector is not displayed on the first LCD 11 even when the object is displayed on the first LCD 11.

A length of each of the vectors 41 to 46 is determined based on a length of each edge of the object 40 which is a rectangular parallelepiped. When a length of edge AB is x, a length of edge AD is y, and a length of edge AE is z, a length of each of the vectors 41 to 46 is determined in accordance with the following expressions (1):

$$\text{(length of vector 41)} = \text{(length of vector 42)} = x \cdot y/2z$$

$$\text{(length of vector 43)} = \text{(length of vector 44)} = y \cdot z/2x$$

$$\text{(length of vector 45)} = \text{(length of vector 46)} = x \cdot z/2y \quad (1)$$

As shown in the expression (1), a length of each of the vectors 41 to 46 is calculated based on an area of a face associated with the vector and a length of an edge parallel to the vector. Note that a length of a vector indicates, when an object lands, a landing easiness (standing easiness) on a face associated with the vector. Details will be provided later.

Each of the vectors 41 to 46 is provided at a time when the object 40 is thrown. That is, the game device 10 determines a direction and length of each of the vectors 41 to 46 in response to an action of the object 40 thrown in the game. As described above, a direction of each of the vectors 41 to 46 is provided to be perpendicular to a face with which the vector is associated. A length of each of the vectors 41 to 46 is provided in accordance with the above expression (1). In the first embodiment, since a starting point of each of the vectors 41 to 46 is predetermined to be at the center of the object 40, each of the vectors 41 to 46 can be indicated as a three-dimensional vector (x, y, Z) from the center of the object 40 to an end of the vector. Note that in another embodiment, each of the vectors 41 to 46 may be predetermined for the object 40, i.e., data indicating each of the vectors 41 to 46 may be stored in the memory card 17 of the ROM 171 as game data, together with data indicating the object 40.

Each of the vectors 41 to 46 is provided to the object 40 in a fixed manner. Even when the object 40 moves in a game space, there is no change in a relative positional relationship between the object 40 and each of the vectors 41 to 46. Thus, when coordinates of the object 40 in the three-dimensional game space is changed, coordinates of each of the vectors 41 to 46 in the three-dimensional game space are changed accordingly by an amount of change in the coordinates of the object 40. In addition, when a posture (direction) of the object 40 in the three-dimensional game space is changed, a direction of each of the vectors 41 to 46 in the three-dimensional game space is changed accordingly by an angle of position change in the object 40.

In the first embodiment, a starting point of each of the vectors 41 to 46 is at the center of the object 40. In another embodiment, the starting point may be at any position unless a direction and an end position of each of the vectors 41 to 46 are provided to the object 40 in a fixed manner. For example, a position of the starting point may be at a center of a face (or at any position on a face) associated with the vector. However, there is a merit in assigning the same starting point to each of the vectors 41 to 46 as described in the first embodiment, that a plurality of vectors 41 to 46 can be easily indicated.

During a game, the above object 40 moves in the three-dimensional game space. For example, in a game where a player character (not shown) operated by a player appears in the three-dimensional game space, the object 40 is moved by an action of the player character grabbing and throwing the object 40. When the object 40 is thrown, the game device 10 controls a movement of the object 40 taking into account a virtual gravity provided in the three-dimensional game space, wherein the virtual gravity acts in a predetermined direction. Thus the object 40 performs a falling motion in accordance with the virtual gravity. Note that though in the first embodiment, the predetermined direction is perpendicularly downwards to the ground, in another embodiment, the predetermined direction is not limited to the downward direction. The direction of the virtual gravity may be assigned as appropriate according to the contents of the game. When the object 40 contacts the ground as a result of the falling motion, a landing behavior of the object 40 is calculated by a method shown below.

Figure 4:
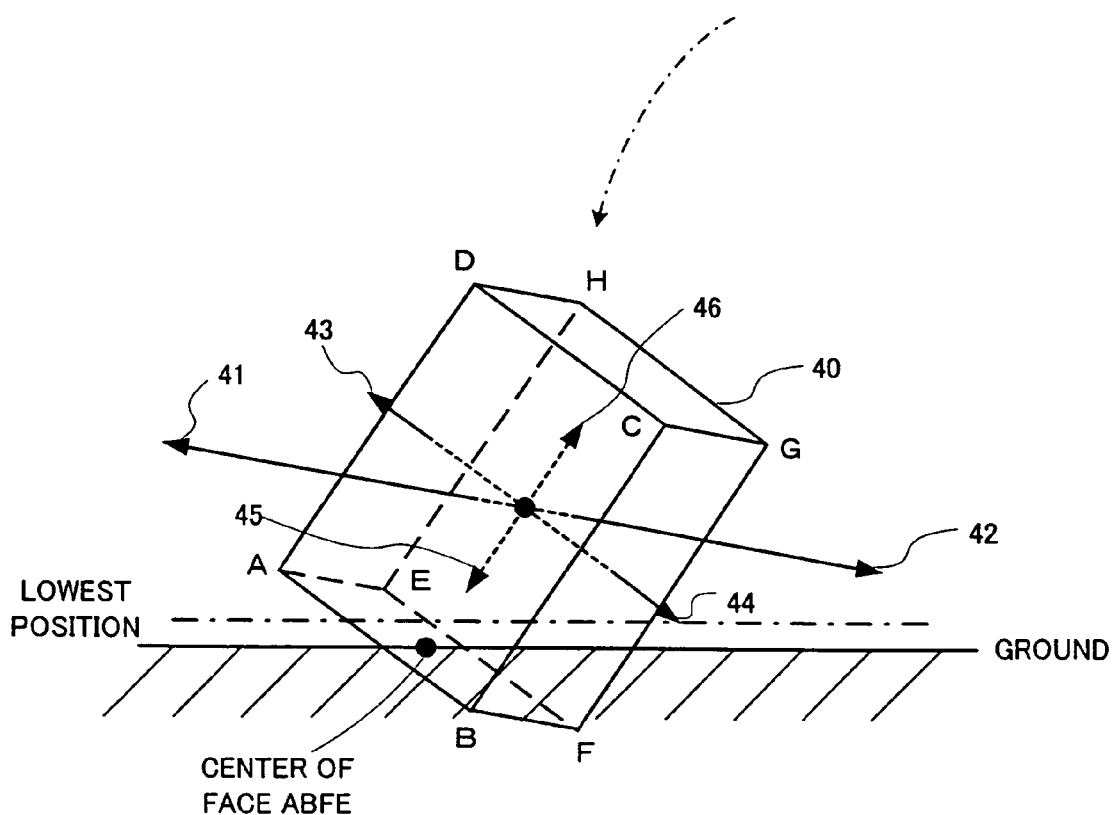
FIG. 4 is a diagram illustrating a state of the object of FIG. 3 contacting a ground.

FIG. 4 is a diagram illustrating a state of the object of FIG. 3 contacting a ground. When the object 40 is performing a falling motion (refer to an arrow in an alternate long and short dashed lines shown in FIG. 4), the game device 10 determines whether a part of the object 40 has contacted the ground or not. Any method may be used for determining whether a part of the object 40 has contacted the ground or not. In the first embodiment, a part of the object 40 is determined to have contacted the ground when a center of any face among the faces of the object 40 has contacted the ground. Note that whether a part of the object 40 has contacted the ground or not may be determined by whether any one vertex of the object 40 has contacted the ground or not. Furthermore, this decision may be made by determining whether a predetermined point on any face among the faces of the object 40 (not limited to the center of the face) has contacted the ground or not. In FIG. 4, a part of the object 40 is determined to have contacted the ground when a center of face ABFE has contacted the ground. Note that FIG. 4 is a diagram viewing a three-dimensional game space from a viewpoint parallel to the ground.

When a part of the object 40 is determined to have contacted the ground, the game device 10 specifies a vector among the vectors 41 to 46, the vector whose end is located at a lowest position. The vector specified here is a vector whose end is located lower than any other vector provided to the object 40. In an example shown in FIG. 4, the vector 44 is specified by the game device 10.

Figure 5:
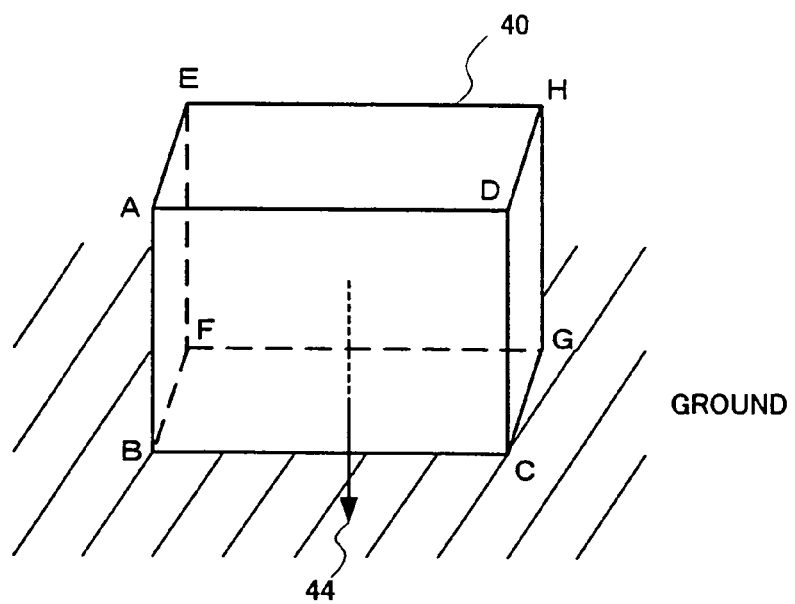
FIG. 5 is a diagram illustrating a landing state of the object 40 of FIG. 4.

Once the vector is specified, the game device 10 lands the object 40 on the ground, the object 40 which is in a state contacting the ground (state shown in FIG. 4). To be more specific, when it is determined that a part of the object 40 has contacted the ground, the game device 10 lands and stops the object 40 on the ground in a position with the specified vector facing perpendicularly downwards to the ground. That is, a face associated with the specified vector is determined as a landing face, and the object 40 lands on the ground such that the landing face contacts the ground. FIG. 5 is a diagram illustrating a state of the object 40 landing on the ground. FIG. 5 is a diagram viewing the three-dimensional game space from a viewpoint above the ground looking obliquely downwards. Since the vector 44 is specified in FIG. 4, the object lands on the ground in a state with the vector 44 facing perpendicularly downwards. Thus, when the object 40 lands, face BFGC associated with the vector 44 becomes the landing face.

As shown in FIG. 4, a vector whose end is located at a lowest position at the time when a part of the object 40 has contacted the ground changes in accordance with a direction of the object when contacting the ground and a length of each vector (or an end position of each vector). For example, if a length of vector 42 or vector 45 is longer than a length shown in FIG. 4, it is possible that the vector whose end is located at a lowest position in FIG. 4 becomes vector 42 or vector 45 instead of vector 44. A probability of an end of a vector to be located at a lowest position changes in accordance with a length of the vector, wherein the probability becomes higher as the length of the vector is increased. Thus, a landing easiness of each face of the object (easiness of the face to become a landing face) is determined in accordance with a length of a vector associated with the face. Thus, according to the first embodiment, it is possible to freely assign a landing easiness of each face of the object by assigning a length of each vector provided to an object. Furthermore, according to the first embodiment, a landing easiness of each face of the object is not attributed to a shape of the object, thus a game creator may freely assign a landing easiness of each face of the object without being restricted by the shape of object.

For example, when it is required to display a realistic landing behavior of the object 40 matching its shape, the game creator is allowed to determine a length of each of the vectors 41 to 46 in accordance with a landing easiness matching the shape of the object 40. To be more specific, by assigning the length of each of the vectors 41 to 46 in accordance with an area of an associated face, the landing behavior of the object 40 is displayed realistically. By assigning a length of a vector which is associated with a face with a large area to be long, and a length of a vector which is associated with a face with a small area to be short, it is possible to provide a setting such that a landing easiness is increased in accordance with an increase in a size of an area. Thus an unnatural behavior such as a small face of an object easily becoming a landing face is avoided, and a landing behavior of an object is displayed in a natural manner. If the game creator requires to assign a landing easiness of a specific face to be higher than that of other faces, the game creator only needs to extend a length of a vector associated to the specific face. For example, in order to provide a setting such that the object 40 easily stands on face ABFE (a setting such as assuming there is a weight inside the object 40 at a side of face ABFE), a length of the vector 45 associated with the face ABFE must be longer than other vectors. As described above, according to the first embodiment, a landing easiness of each face of an object can be easily changed by changing a length of a vector.

Next, a detailed description of a game process to be performed by the game device 10 on executing a game program in the memory card 17 will be provided. When a power of the game device 10 is supplied, the CPU core 21 of the game device 10 executes the game program stored in the memory card 17 and starts the game process. A detail description of the game process will a be provided below by referring to FIGS. 6 and 7.

Figure 6:
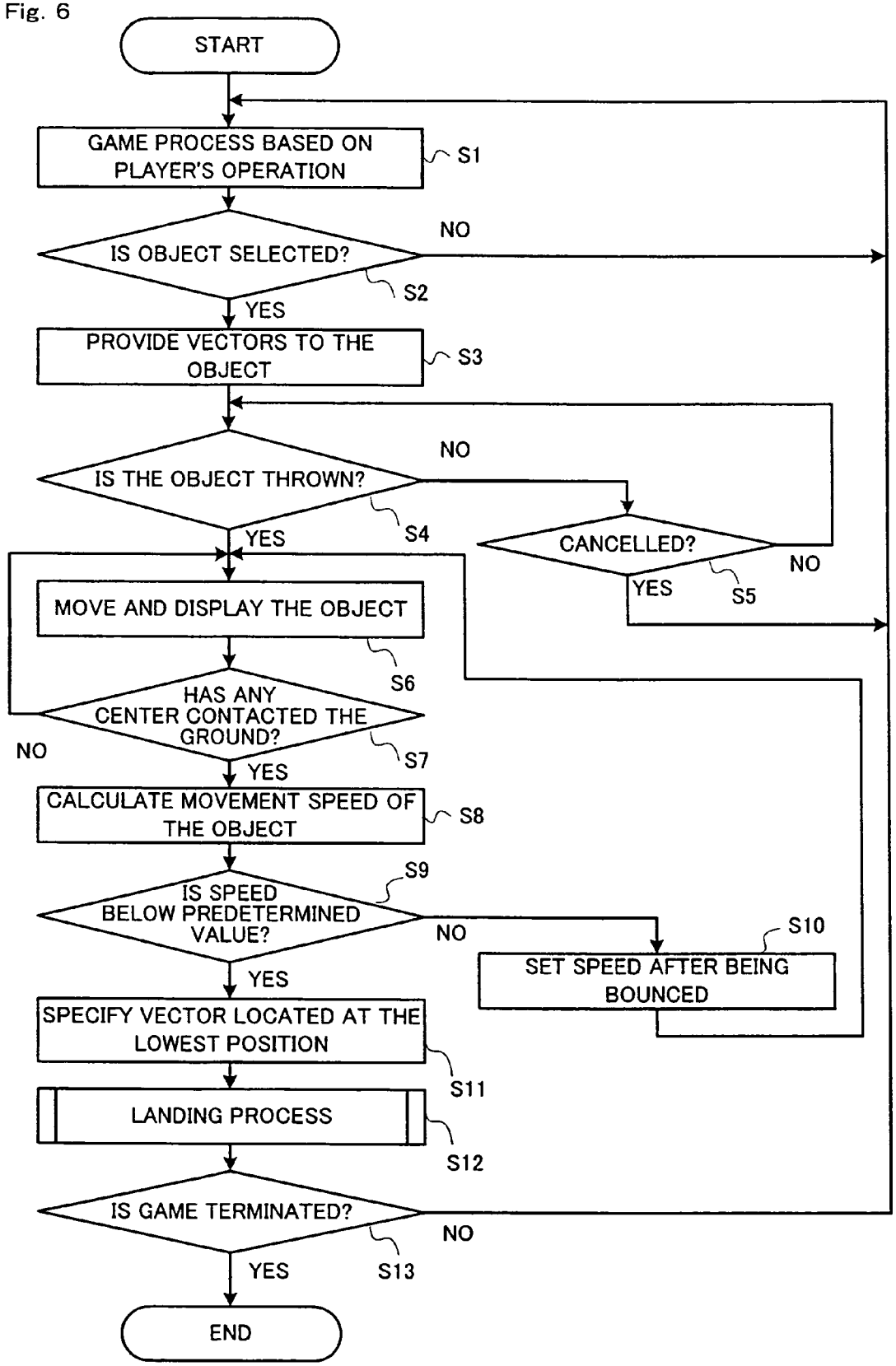
FIG. 6 is a main flowchart illustrating a flow of a game process executed in a game device 10.

FIG. 6 is a main flowchart indicating a game process to be executed in the game device 10. When the game process starts, first a game process based on a player's operation is performed at step S1. This game process is a process for generating some event in a game space according to a player's operation, and to display a state accordingly. The game process mentioned here indicates a game process excluding a process of displaying a landing state of an object that has been thrown. Detail contents of the game process may be of any type.

At step S2 subsequent to step S1, it is determined whether a cubical object 40 is selected as an object to be thrown or not. In the first embodiment, the CPU core 21 determines that the object 40 is selected as an object to be thrown when the player character has grabbed the object 40. Note that an operation of the player character grabbing the object 40 is performed, for example in accordance with a game operation by the player instructing the operation. When it is determined at step S2 that the object 40 is not selected, a process of step S1 is repeated. The processes of steps S1 and S2 are repeated until the object 40 is selected.

On the other hand, when it is determined at step S2 that the object 40 is selected, a process of step S3 is performed. At step S3, vectors are provided to the object 40 which is selected at step S2. To be more specific, six vectors 41 to 46 which are directed from the center of the object 40 perpendicularly toward each face of the object 40 and their lengths calculated by the above expression (1) are provided (refer to FIG. 3).

At step S4 subsequent to step S3, it is determined whether the object 40 which the vectors are provided at step S3 is thrown or not. Thus, in the first embodiment, it is determined whether the player character has performed an operation to throw the object 40 or not. This operation is performed, for example, by a certain game operation performed by the player.

When it is determined at step S4 that the object 40 is not thrown, a process of step S5 is performed. That is, at step S5, it is determined whether a selection of the object 40 is cancelled or not. To be more specific, when the player character releases the object 40, the CPU core 21 determines that the selection of the object 40 is cancelled. When it is determined at step S5 that the selection of the object 40 is cancelled, the process returns to step S1 and the process of step S1 is repeated. On the other hand, when it is determined at step S5 that the selection of the object 40 is not cancelled, the process returns to step S4 and the process of step S4 is repeated.

On the other hand, when it is determined at step S4 that the object 40 is thrown, a process of step S6 is performed. That is, a state of the object 40 thrown by the player character and moving in the three-dimensional game space is displayed on the first LCD 11. To be more specific; the CPU core 21 calculates a position of the object 40 in a frame to be displayed next, and moves the object 40 to the position obtained by the calculation. Then, the CPU core 21 displays the object 40 on the first LCD 11 in the position after being moved. In a process of step S6, the CPU core 21 calculates a behavior of the object 40 (size and direction of a movement speed) taking a virtual gravity into account. In addition, when a position of the object 40 is calculated at step S6, a position of each of the vectors 41 to 46 to be provided to the object 40 is also calculated (indicated by an end position of a vector in the first embodiment).

At step S7 subsequent to step S6, it is determined whether a center of any face among the faces of the object 40 has contacted the ground or not. A determination process at step S7 is a process for determining whether a part of the object 40 has contacted the ground or not. When it is determined at step S7 that no center of a face of the object 40 has contacted the ground, step S6 is repeated. The processes of steps S6 and S7 are executed at each unit time (e.g., at each frame period). Thus, at steps S6 and S7, a position of the object 40 in motion is calculated and displayed at each unit time, and whether a part of the object 40 has contacted the ground or not is determined at each unit time.

On the other hand, when it is determined at step S7 that a center of any face among the faces of the object 40 has contacted the ground, a process of step S8 is performed. That is, at step S8, a size and a direction of a movement speed of the object 40 are calculated. The movement speed calculated here is a movement speed at a time when a part of the object 40 has contacted the ground, and the movement speed is indicated by a three-dimensional vector. In the first embodiment, the movement speed of the object 40 is a movement speed of the object 40 as a whole, i.e., a movement speed of the center of the object 40.

At step S9 subsequent to step S8, it is determined whether a size of the movement speed calculated at step S8 is below a predetermined value or not. A determination process at step S9 is a process for determining a subsequent behavior of the object 40. To be more specific, the determination process is a process for determining whether to bounce or land the object 40. When it is determined at step S9 that a value of the movement speed exceeds a predetermined value, processes of step S10 and thereafter are performed. The processes of step S10 and thereafter are processes for bouncing the object 40. On the other hand, when it is determined at step 9 that a value of the movement speed is equal to or below a predetermined value, processes of steps S11 and S12 are performed. The processes of steps S11 and S12 are processes of landing the object 40 on the ground.

At step S10, a size and a direction of a movement speed of the object 40 after being bounced are calculated. The movement speed after being bounced is calculated based on the movement speed before being bounced, i.e., based on the movement speed calculated at step S8. To be more specific, when a coordinate system of a three-dimensional game space is a XYZ coordinate system, and the ground is on a XZ surface (plane surface of X=0 and Z=0), a movement speed after being bounced (v2x, v2y, v2z) is calculated by a following expression (2). A movement speed before being bounced is indicated as (v1x, v1y, v1z) in the expressions (2).

$$v2x = v1x \times Nx$$

$$v2y = v1y \times Ry$$

$$v2x = v1z \times Nz \qquad (2)$$

Above, Nx is a coefficient of friction and a constant in a range of 0<Nx<1. Ry is a coefficient of reflection in a Y direction and a constant in a range of −1<Ry<0. Nz is a coefficient of friction in a Z direction, and a constant in a range of 0<Nz<1.

A loop process of steps S6 and S7 is executed after step S10. In this loop process, a bouncing behavior of the object 40 which its part has contacted the ground is calculated based on the above movement speed after being bounced, and a bouncing state of the object 40 is displayed on the first LCD 11. The processes of steps S6 and S7 are repeated until a part of the object 40 is determined to have contacted the ground at step S7.

At step S11, a vector whose end is located at a lowest position is specified among each of the vectors 41 to 46 provided to the object 40 (refer to FIG. 4). A process of step S11 is performed based on an end position of each of the vectors 41 to 46 calculated at the immediately preceding step S6. In the first embodiment, the ground is at the XZ surface, and a direction of gravity (a direction of an act of a virtual gravity) is perpendicularly downward to the ground, thus the direction of gravity is in a minus direction of a Y axis. Therefore, a vector specified at step S11 is the vector which its Y coordinate value of the coordinates indicating an end position of the vector is smallest.

At step S12 subsequent to step S11, a landing process is performed. The landing process is a process of landing the object 40, when a part of the object is determined to have contacted the ground, in a state such that a vector specified at step S12 faces perpendicularly toward the ground. A detail landing process will be provided below with reference to FIG. 7.

Figure 7:
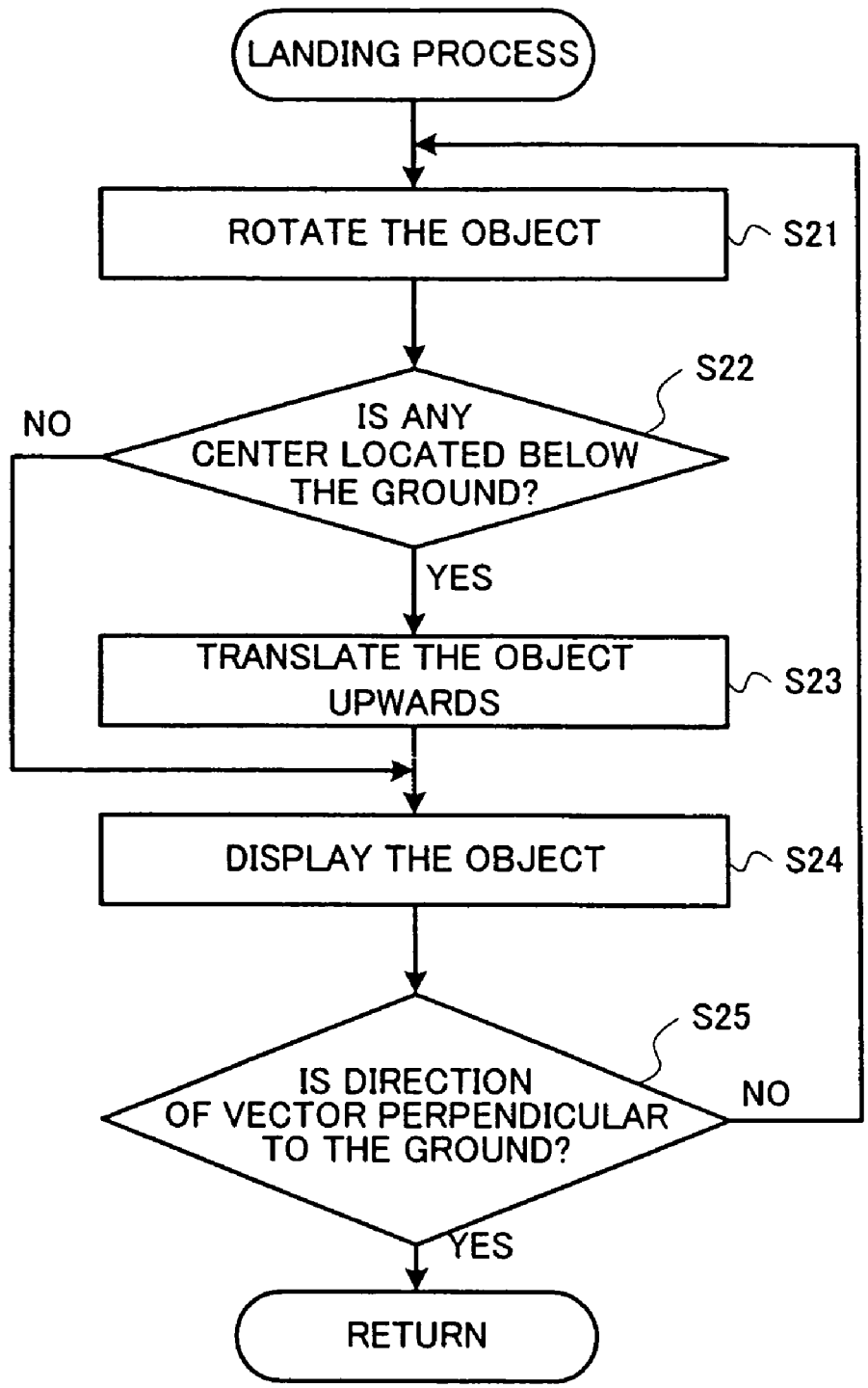
FIG. 7 is a flowchart illustrating a detail landing process taken at step S12 of FIG. 6.

FIG. 7 is a flowchart describing detail landing process of step S12 shown in FIG. 6. A loop process of steps S21 to S25 shown in FIG. 7 is a process performed at each predetermined unit time (e.g., at each frame period). In the landing process, first at step S21, a position of the object 40 being rotated by a given angle is calculated. This given angle is an angle by which the object 40 is rotated during the above predetermined unit time. The given angle may be a predetermined value or may be calculated for each landing process by dividing by an integer, a difference between an angle of a current direction of the vector specified at step S11 and an angle of a direction perpendicularly downward to the ground. In addition, when a position of the object 40 being subjected to a rotating movement is calculated at step S21, a position of each of the vectors 41 to 46 is calculated in accordance with the rotating movement.

At step S22 subsequent to step S21, it is determined whether a center of any face among the faces of the object 40 which its new position is calculated at step S21 is located below the ground or not. When it is determined at step S22 that a center of any face among the faces is located below the ground, a process of step S23 is performed. That is, a position of the object 40 being translated upwards is calculated at step S23. To be more specific, a position of translating the object 40 upwards so that the center located below the ground contacts the ground is calculated. Note that when a position of translating the object 40 is calculated at step S23, a position of each of the vectors 41 to 46 in accordance with the translation is calculated.

When the object 40 is rotated at step S21, there are cases when a center of any face among the faces of the object 40 is located below the ground, thus being displayed as if the object 40 is sunk into the ground. Therefore, in the first embodiment, the object 40 is translated upwards at step S23 so that the object 40 after being rotated is located at a position contacting a surface of the ground. Thus, the object 40 is displayed on the surface of the ground. The processes of steps S22 and S23 are for preventing the object 40 to be displayed as if sinking in the ground.

On the other hand, when it is determined that a center of any face among the faces of the object 40 is located above the ground, a process of step S23 is skipped, and a process of step S24 is performed. Also the process of step S24 is performed after the process of step S23. At step S24, the object 40 is displayed on the first LCD 11 in a position calculated at steps S21 and S23. At a subsequent step S25, it is determined whether a direction of the vector specified at step S11 has become perpendicular to the ground or not. Note that when the given angle at step S21 is a predetermined angle, a direction of the vector may not completely match with a direction perpendicular to the ground. Thus, in this case, if a direction of the vector is almost equal to the direction perpendicular to the ground (concretely, if a difference in an angle between a direction of the vector and the direction perpendicular to the ground is below a predetermined value) it may be determined that a direction of the vector and the direction perpendicular to the ground are matched. When it is determined at step S25 that a direction of the vector is not perpendicular to the ground, since it is required to further provide a rotating movement to the object 40, the process of step S21 is performed. Thereafter, the processes of steps S21 to S25 are repeated until a direction of the vector is matched with the direction perpendicular to the ground. On the other hand, when it is determined at step S25 that a direction of the vector is perpendicular to the ground, the CPU core 21 terminates the landing process.

Returning to the description of FIG. 6, at step S13 subsequent to step S12, it is determined whether to terminate the game or not. This decision is made by determining whether or not a game is cleared, a game is over, an instruction to terminate the game is made by the player, and the like. When it is determined at step S13 not to terminate the game, the process of step S1 is repeated. Thereafter, the processes of steps S1 to S13 are repeated until the game is terminated. On the other hand, when it is determined at step S13 to terminate the game, the CPU core 21 terminates the game process shown in FIG. 6.

As described above, according to the first embodiment, by assigning vectors to an object which are subjected to a landing process, a landing face of the object is determined by using the vectors. Unlike a conventional method, since a shape of the object does not need to be taken into consideration on determining a landing face, the landing face can be determined freely without being restricted by the shape of object. In addition, a landing face is determined by an easy calculation by merely determining an end position of each vector provided to the object.

Second Embodiment

Next a second embodiment will be described. Since a configuration of a game device according to the second embodiment is same as the configuration shown in FIGS. 1 and 2, a plan view and a block diagram of the game device according to the second embodiment will be omitted. A description of the second embodiment will be described below on focusing on the difference from the first embodiment.

Figures 8, 9:
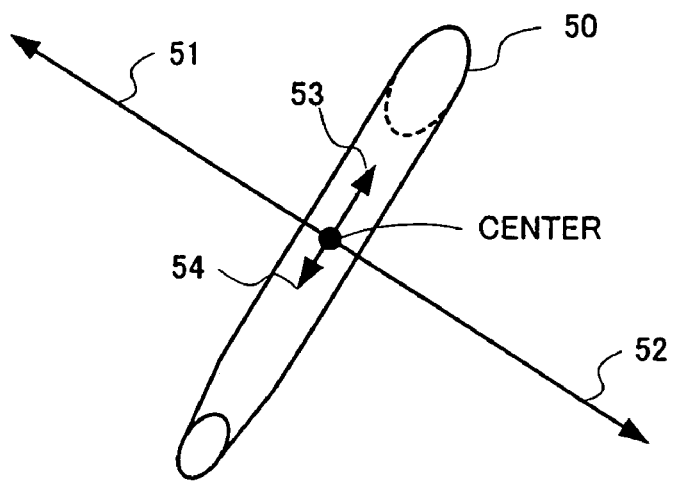
FIG. 8 is a diagram illustrating an object according to a second embodiment.
FIG. 9 is a diagram exemplifying a vector assignment table.

FIG. 8 is a diagram illustrating an object according to the second embodiment. A object 50 shown in FIG. 8 is a columnar solid having an elliptical section. This columnar object 50 has a shape in which a diameter of the elliptical section becomes smaller toward one end. An object subjected to a landing process according to the present invention is not limited to a rectangular parallelepiped object as mentioned above, but may be an object having a curved surface as the object 50. In addition, an object subjected to a landing process may be an object consisting only of a curved surface (without a plane surface) such as an object that will be described later in FIG. 13.

The object 50 shown in FIG. 8 is provided with four vectors 51 to 54, which are; a first vector 51, a second vector 52, a third vector 53, and a fourth vector 54. In an example shown in FIG. 8, the vectors 51 and 52 are parallel to a direction of a minor axis of the elliptical section of the object 50. The vectors 53 and 54 are perpendicular to the elliptical section of the object 50. A position of a starting point of each of the vectors 51 to 54 is at a center of the object 50 as same as the first embodiment.

In FIG. 8, the third vector 53 is associated with an end face having a larger area among the two end faces of the columnar object 50, and the vector 54 is associated with an end face having a smaller area among the two end faces of the columnar object 50. However, there is no face associated with the vectors 51 and 52. As above, a vector according to the example embodiment presented herein is not necessarily associated with any one of the faces of the object. In other words, the example embodiment is applicable to an object having a curved surface, and has a merit that a landing position can be easily calculated even for an object having a curved surface.

According to the second embodiment, a direction and an end position of each of the vectors 51 to 54 are determined by referring to a predetermined vector assignment table. FIG. 9 is a diagram exemplifying a vector assignment table. As shown in FIG. 9, in the vector assignment table, data indicating a length and a direction is associated with each vector. Taking the first vector 51 for example, a length is "20" and a direction is "(xa, ya, za)". The direction is a direction from a center of an object. Note that in a case where a position of a starting point of each vector is predetermined, the vector assignment table may store only an end position for each vector. In such vector assignment table, a direction and an end position of a vector may be uniquely determined.

As shown in FIGS. 8 and 9, according to the second embodiment, when vectors are provided to the object 50, each of the vectors 51 to 54 is provided in accordance with the vector assignment table. In the above first embodiment, a length of each vector is calculated by using a length of each edge of a rectangular parallelepiped, however, as shown in the second embodiment, a length of each vector may be predetermined. In the second embodiment, vectors may be freely assigned to an object as in the first embodiment, and a landing easiness in each position may be freely assigned to the object. The vector assignment table is to be prestored in the memory card 17 together with the game program. Furthermore, contents of the vector assignment table may be changed later in accordance with the game contents or an instruction from the player.

Figure 10:
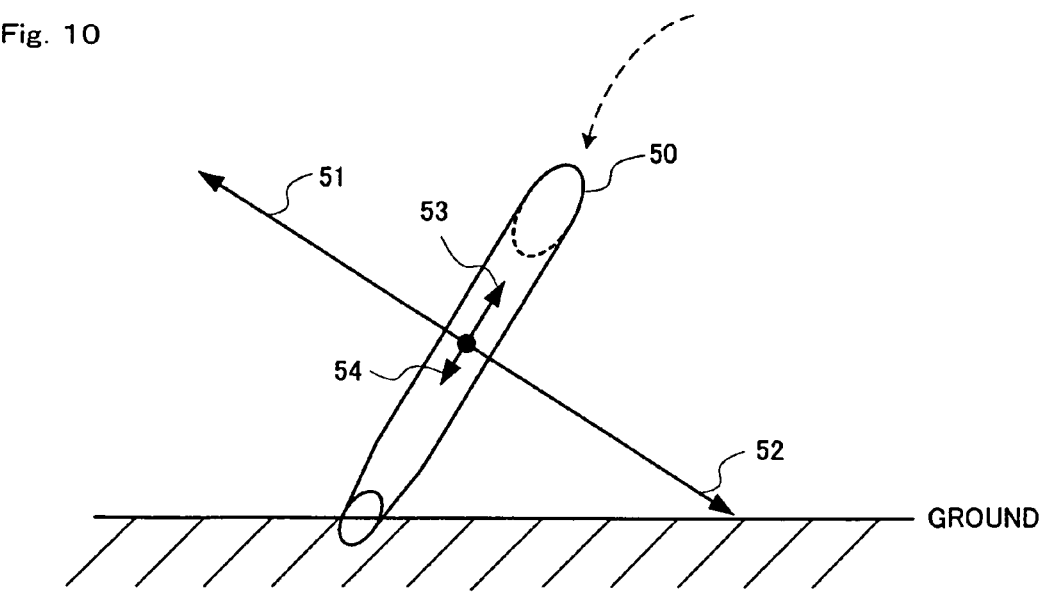
FIG. 10 is a diagram illustrating a state of the object 50 of FIG. 8 contacting a ground.

Next a method of determining whether a part of the object 50 has contacted a ground or not will be described. In the second embodiment, each of the vectors 51 to 54 is used for determining whether a part of the object 50 has contacted the ground or not. To be more specific, when the object 50 is thrown, the game device 10 determines whether a part of the object 50 has contacted the ground or not based on whether an end of any vector among the vectors 51 to 54 has contacted the ground or not. FIG. 10 is a diagram illustrating a state of the object 50 shown in FIG. 8 contacting the ground. In FIG. 10, since an end of the second vector 52 is contacting the ground, the object 50 is determined to have contacted the ground.

Figure 11:
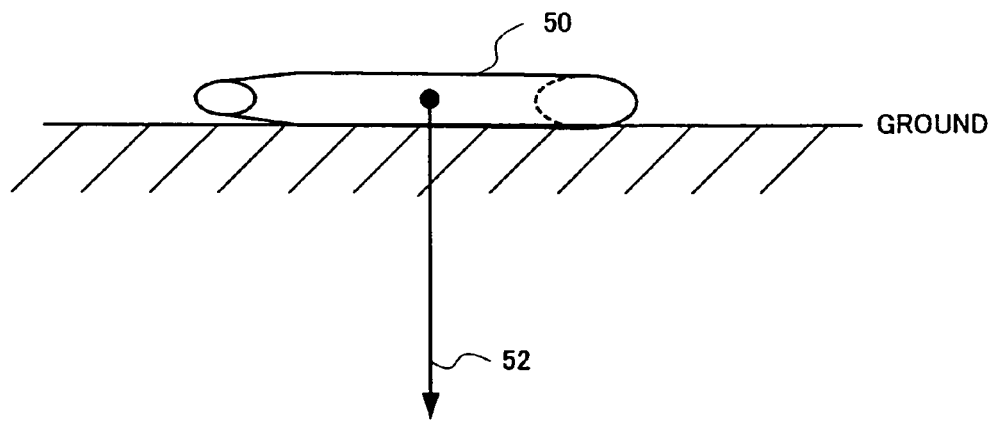
FIG. 11 is a diagram illustrating a landing state of the object 50 of FIG. 8.

In addition, according to the second embodiment, when a part of the first object 50 is determined to have contacted the ground, a vector among the vectors 51 to 54, the vector whose end is located at a lowest position is specified as in the first embodiment. The specified vector is the vector whose end is contacting the ground, i.e., the second vector 52. Thus, a movement control to land the object 50 such that the second vector 52 faces perpendicularly downward to the ground is performed. FIG. 11 is a diagram illustrating a landing state of the object 50 shown in FIG. 8.

Figure 12:
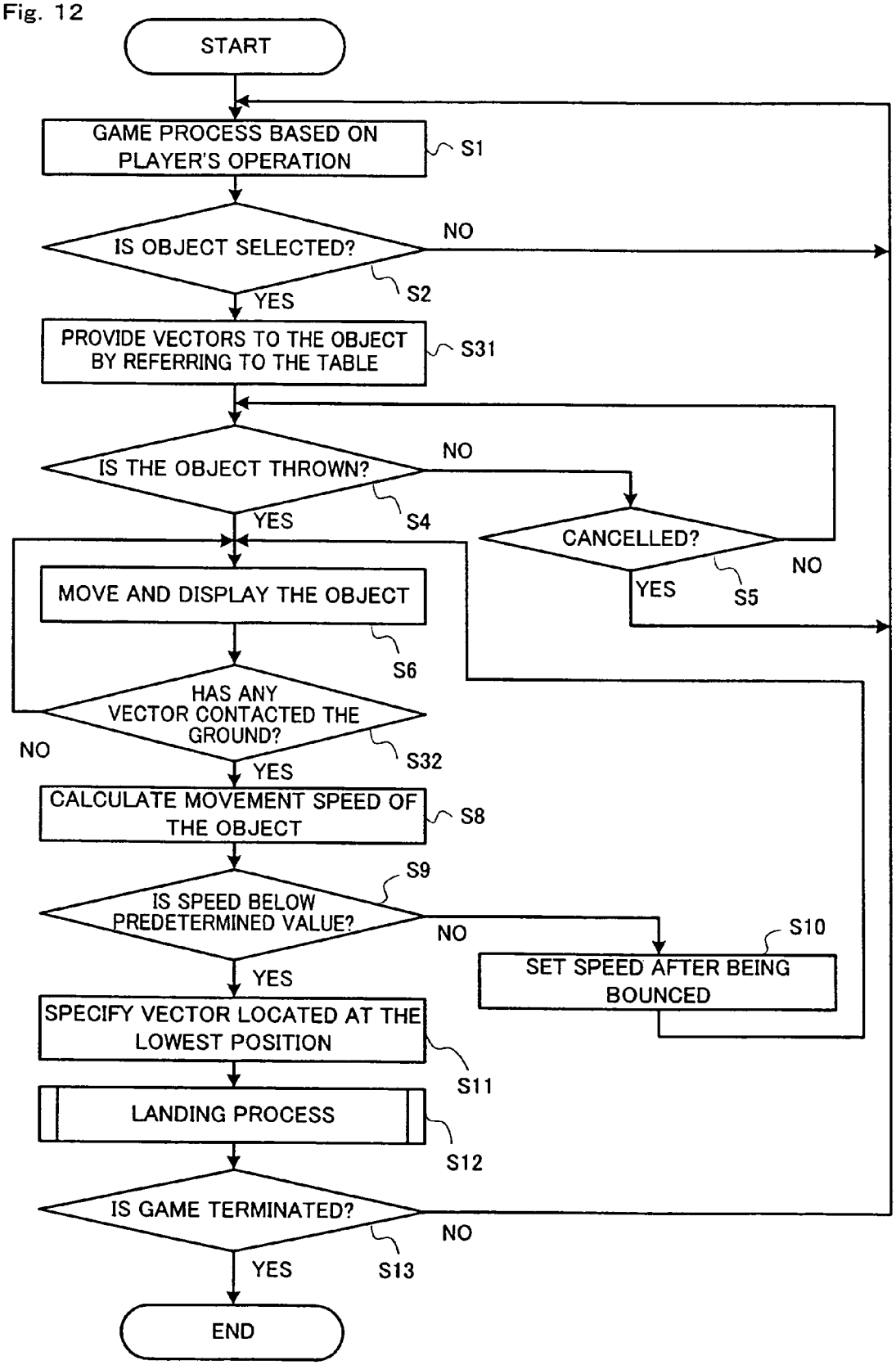
FIG. 12 is a main flowchart illustrating a flow of a game process according to a second embodiment.

FIG. 12 is a main flowchart illustrating a game process according to the second embodiment. The flowchart shown in FIG. 12 is same as the flowchart shown in FIG. 6 except that a process of step S31 is performed in place of step S3, and a process of step S32 is performed in place of step S7. Thus, steps in FIG. 12 which are equivalent to those of FIG. 6 will be provided with same step numbers, and descriptions of those steps will be omitted here.

In the second embodiment, when a decision made at step S2 is in the affirmative (YES), a process of step S31 is performed. At step S31 each of the vectors 51 to 54 is provided to the object 50 by referring to the vector assignment table. Also, in the second embodiment, step S32 is performed subsequent to step S6. At step S32 it is determined whether an end of any vector among the vectors 51 to 54 provided to the object 50 has contacted the ground or not. When a coordinate system of a three-dimensional game space is a XYZ coordinate system, and the ground is at a XZ surface (plane surface of X=0 and Z=0), it is determined at step S32 whether a Y component of the position coordinates at an end of each of the vectors 51 to 54 is 0 and below or not. On the other hand, when it is determined at step S32 that an end of any vector among the vectors 51 to 54 has contacted the ground, a process of step S8 is performed. On the other hand, when it is determined at step S32 that there is no end of each of the vectors 51 to 54 that is contacting the ground, a process of step S6 is repeated.

Note that though in FIG. 12, the process of step S32 is performed in place of step S7 shown in FIG. 6, the process of step S7 may also be performed in the second embodiment as in the first embodiment.

As mentioned above, since each vector may be freely assigned to an object also according to the second embodiment, a landing face may be freely determined without being restricted by a shape of the object, and the same effect as the first embodiment is obtained.

According to the first and second embodiments, though the description is provided on an object having a rectangular parallelepiped shape or a columnar solid shape, an application of the example embodiment presented herein is not limited by a shape of an object. For example, it is possible to apply the example embodiment to an object having a complicated shape, and to obtain the same effect as the above-mentioned embodiments.

Figure 13:
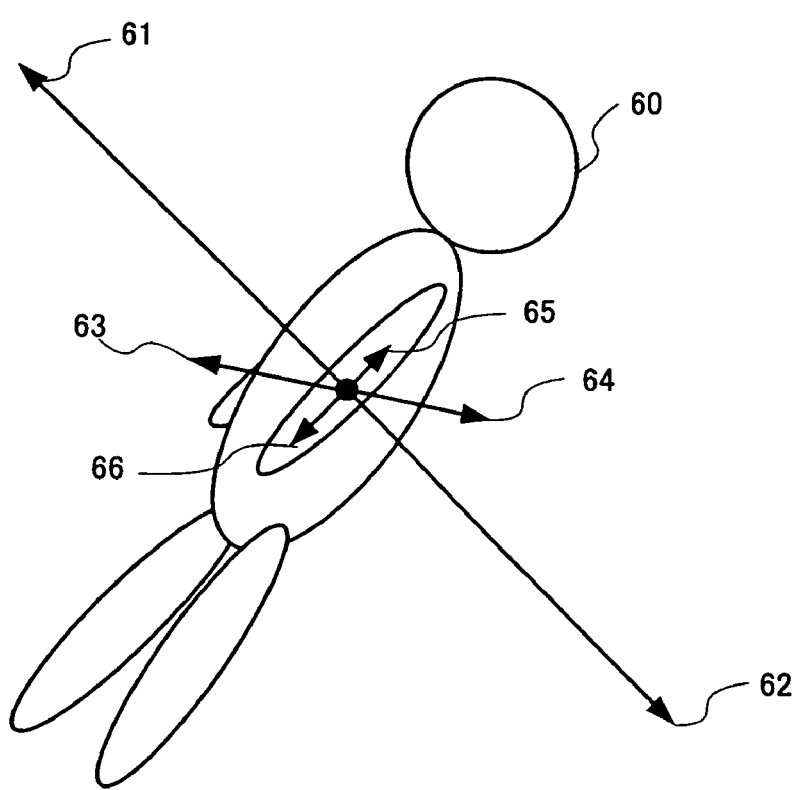
FIG. 13 is a diagram exemplifying an object and a vector provided to the object according to another embodiment.
Figure 14:
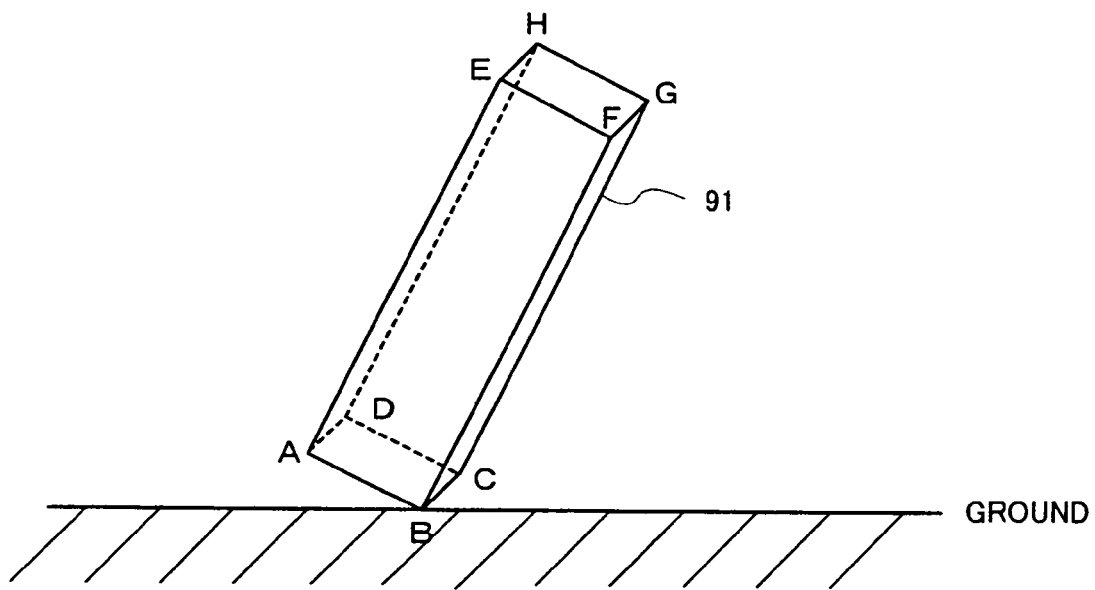
FIG. 14 is a diagram illustrating a state of a falling object contacting a ground according to a conventional method.
Figure 15:
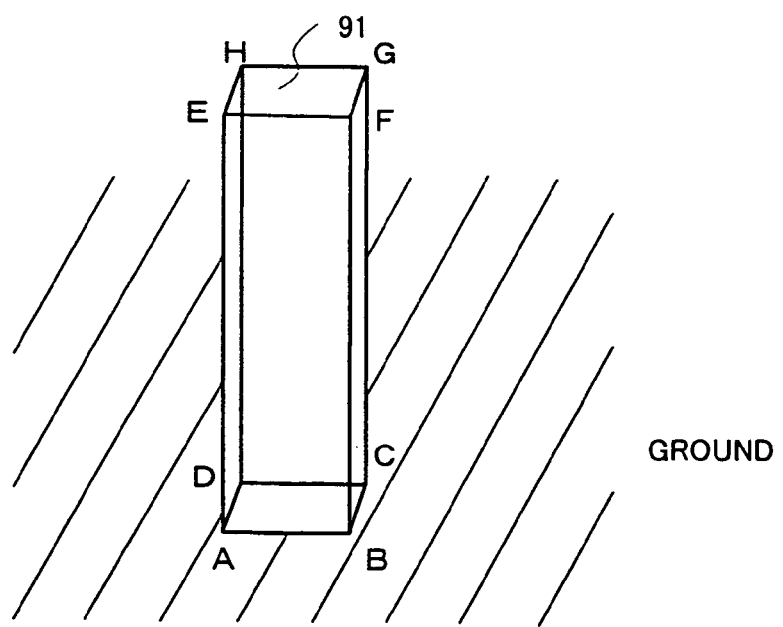
FIG. 15 is a diagram illustrating a landing state of the object of FIG. 14.

FIG. 13 is a diagram exemplifying an object and vectors provided to the object according to another embodiment. As shown in FIG. 13, the example embodiment presented herein is applicable to an object having a complicated shape as a human shaped object 60. In FIG. 13, though six vectors 61 to 66 are provided to the object 60, a number of vectors provided to the object 60 only needs to be matched with a number of directions in which the object 60 is required to be landed. For example, if it is required to land the human shaped object 60 in either direction of a head facing downwards or feet facing downwards, it is only necessary to assign the vectors 65 and 66 without assigning the remaining vectors 61 to 64. In addition, a length of each of the vectors 61 to 66 may be assigned as appropriate in accordance with a landing easiness in each direction of the vector. A direction of each of the vectors 61 to 66 may also be assigned as appropriate according to a required landing direction. Regardless of how the vectors are provided, a direction in which to land the object 60 is easily determined by the process described in the above embodiments.

In another embodiment, a vector provided to an object may be indicated in any form as far as an end position (a position determined relative to the object) and a direction can be determined. For example, when an object is a polyhedron configured with plane surfaces, vectors provided to the object may be indicated as points provided in association with each face. In this case, a position of a provided point indicates an end position of a vector, and a perpendicular line extended from the point toward a face associated with the point indicates a direction of the vector. Thus, a vector provided to an object is not necessarily indicated as vector data indicating a direction and an end position of the vector, but may be indicated as coordinate data indicating a position which is determined relative to the object.

In addition, though the direction of gravity is described to be downwards in the above embodiments, the direction of gravity may be provided as appropriate in accordance with the game contents or game progress. The direction of gravity in any direction is applicable to the example embodiment presented herein. For example, the example embodiment is also applicable in a case where the direction of gravity is upwards and a state of an object rolling on a ceiling is displayed. Furthermore, though in the above embodiments, it is descried that the ground is a surface perpendicular to the direction of gravity, the ground may not necessary be perpendicular to the direction of gravity. Even when the ground is provided oblique to the direction of gravity, a landing state of an object can be displayed by the process described in the above embodiments.

While an example embodiment has been described in detail, the foregoing description is in all aspects illustrative and not restrictive. It is understood that numerous other modifications and variations can be devised without departing from the scope of the example embodiment.

What is claimed is:

1. A non-transitory computer readable storage medium having stored therein a game program that causes a game device to execute the step comprising:
    displaying on a display device a state of an object landing on a predetermined surface in a virtual three-dimensional game space, wherein
    the object is provided with a plurality of vectors each having a direction and an end assigned to the object in a fixed manner,
    the object is comprised of a plurality of faces, and each of the plurality of vectors is respectively assigned to a face of the object in a direction perpendicular to the face;
    wherein the length of each vector is varied based on preselection of a particular face of the object without determination of the object landing on the predetermined surface based on the area and the weight of the object, and the length is not attributed to a shape of the object, the game program causes a computer of the game device during game play to function as:
    movement control programmed logic circuitry configured to move the object in the three-dimensional game space;
    determination programmed logic circuitry configured to determine whether a part of the object has contacted the predetermined surface;
    specifying programmed logic circuitry configured to specify, when a part of the object is determined by the determination programmed logic circuitry to have contacted the predetermined surface, a vector among the plurality of vectors, the vector having an end located at a position closest to a predetermined direction; and
    landing programmed logic circuitry configured to land the object on the predetermined surface in a position such that the vector specified by the specifying programmed logic circuitry faces toward the predetermined surface and is perpendicular to the predetermined surface.

2. The storage medium according to claim 1, wherein the object is comprised of a plurality of faces, and each of the faces is provided with a point; and the determination programmed logic circuitry determines that a part of the object has contacted the predetermined surface when the point on any face among of the plurality of faces of the object contacts the predetermined surface.

3. The storage medium according to claim 1, wherein the determination programmed logic circuitry determines that a part of the object has contacted the predetermined surface when an end of any vector among the plurality of vectors contacts the predetermined surface.

4. The storage medium according to claim 1, wherein a length from a center of the object to an end of each of the plurality of vectors is provided such that the length is increased in accordance with an area of a face which the vector is associated with.

5. The storage medium according to claim 1, wherein the landing programmed logic circuitry includes:
rotation programmed logic circuitry configured to rotate the object so that the vector specified by the specifying programmed logic circuitry faces toward the predetermined surface, and is perpendicular to the predetermined surface; and translation programmed logic circuitry configured to translate the object so that the object after being rotated by the rotation programmed logic circuitry contacts the predetermined surface.

6. The storage medium according to claim 1, wherein when a part of the object is determined by the determination programmed logic circuitry to have contacted the predetermined surface, the game program further causes the computer to function as speed calculation programmed logic circuitry configured to calculate a movement speed of the object when the object has contacted the predetermined surface, and the landing programmed logic circuitry lands the object on the predetermined surface only when a calculation result provided by the speed calculation programmed logic circuitry is below a predetermined speed.

7. The storage medium according to claim 1, wherein a longer vector is associated with a smaller surface area of the object.

8. A game device, the game device comprising:
a display configured to display a state of an object landing on a predetermined surface in a virtual three-dimensional game space, wherein
the object is provided with a plurality of vectors each having a direction and an end assigned to the object in a fixed manner,
the object is comprised of a plurality of faces, and each of the plurality of vectors is respectively assigned to a face of the object in a direction perpendicular to the face; and
wherein the length of each vector is varied based on pre-selection of a particular face of the object without determination of the object landing on the predetermined surface based on the area and the weight of the object, and is not attributed to a shape of the object,
the game device during play further comprising:
movement control programmed logic circuitry configured to move the object in the three-dimensional game space;
determination programmed logic circuitry configured to determine whether a part of the object has contacted the predetermined surface;
specifying programmed logic circuitry configured to specify, when a part of the object is determined by the determination programmed logic circuitry to have contacted the predetermined surface, a vector among the plurality of vectors, the vector having an end located at a position closest to a predetermined direction; and
landing programmed logic circuitry configured to land the object on the predetermined surface in a position such that the vector specified by the specifying programmed logic circuitry faces toward the predetermined surface and is perpendicular to the predetermined surface.

9. The game device according to claim 8, wherein a longer vector is associated with a smaller surface of the object.

10. A non-transitory computer readable storage medium having stored therein a game program that causing a game device to execute the step comprising:
displaying on a display device a state of an object landing on a predetermined surface in a virtual three-dimensional game space, wherein
the object is provided with a plurality of vectors each having a direction and an end assigned to the object in a fixed manner,
the object is comprised of a plurality of faces, and each of the plurality of vectors is respectively assigned to a face of the object in a direction perpendicular to the face;
wherein the length of each vector is varied in a predetermined way based on pre-selection of a particular face of the object without determination of the object landing on the predetermined surface based on the area and the weight of the object, and is not attributed to a shape of the object, the game program causes a computer of the game device during game play to function as:
movement control programmed logic circuitry configured to move the object in the three-dimensional game space;
determination programmed logic circuitry configured to determine whether a part of the object has contacted the predetermined surface;
specifying programmed logic circuitry configured to specify, when a part of the object is determined by the determination programmed logic circuitry to have contacted the predetermined surface, a vector among the plurality of vectors, the vector having an end located at a position closest to a predetermined direction; and
landing programmed logic circuitry configured to land the object on the predetermined surface in a position such that the vector specified by the specifying programmed logic circuitry faces toward the predetermined surface and is perpendicular to the predetermined surface, wherein
a longer vector is associated with a smaller surface area of the object.

11. A game device, the game device comprising:
a display configured to display a state of an object landing on a predetermined surface in a virtual three-dimensional game space, wherein
the object is provided with a plurality of vectors each having a direction and an end assigned to the object in a fixed manner,
the object is comprised of a plurality of faces, and each of the plurality of vectors is respectively assigned to a face of the object in a direction perpendicular to the face; and
wherein the length of each vector is varied in a predetermined way based on pre-selection of a particular face of the object without determination of the object landing on the predetermined surface based on the area and the weight of the object, and is not attributed to a shape of the object, the game device during play further comprising:

movement control programmed logic circuitry configured to move the object in the three-dimensional game space;

determination programmed logic circuitry configured to determine whether a part of the object has contacted the predetermined surface;

specifying programmed logic circuitry configured to specify, when a part of the object is determined by the determination programmed logic circuitry to have contacted the predetermined surface, a vector among the plurality of vectors, the vector having an end located at a position closest to a predetermined direction; and landing programmed logic circuitry configured to land the object on the predetermined surface in a position such that the vector specified by the specifying programmed logic circuitry faces toward the predetermined surface and is perpendicular to the predetermined surface, wherein a longer vector is associated with a smaller surface of the object.

* * * * *